US008539712B2

(12) United States Patent
Perkins (10) Patent No.: US 8,539,712 B2
(45) Date of Patent: Sep. 24, 2013

(54) MAPLE SYRUP PRODUCTION SPOUT ASSEMBLY WITH BACKFLOW CHECK VALVE

(75) Inventor: Timothy D. Perkins, Richmond, VT (US)

(73) Assignee: University of Vermont and State Agricultural College, Burlington, VT (US)

( * ) Notice: Subject to any disclaimer, the term of this patent is extended or adjusted under 35 U.S.C. 154(b) by 378 days.

(21) Appl. No.: 12/286,032

(22) Filed: Sep. 26, 2008

(65) Prior Publication Data

US 2010/0078082 A1   Apr. 1, 2010

(51) Int. Cl.
*A01G 23/14*   (2006.01)

(52) U.S. Cl.
USPC .............................................. 47/52

(58) Field of Classification Search
USPC .................................. 47/52, 51, 53
See application file for complete search history.

(56) References Cited

U.S. PATENT DOCUMENTS

| 144,844 | A | 11/1873 | Gould et al. |
| 530,663 | A | 12/1894 | Shaw |
| 2,267,902 | A | 12/1941 | Eddins |
| 2,608,412 | A * | 8/1952 | Bletcher et al. ............... 137/215 |
| 2,701,579 | A | 2/1955 | Hasselquist |
| 2,711,186 | A | 6/1955 | Perez |
| 2,877,601 | A | 3/1959 | Griggs |
| 2,958,158 | A | 3/1959 | Hatton |
| 2,944,369 | A | 7/1960 | Soule |
| 3,046,698 | A | 7/1962 | Breen et al. |
| 3,057,115 | A | 10/1962 | Bilanin |
| 3,156,069 | A | 11/1964 | Lamb |
| 3,204,370 | A | 9/1965 | Lamb |
| 4,063,570 | A | 12/1977 | Mitchell et al. |
| 4,232,704 | A | 11/1980 | Becker et al. |
| 4,284,097 | A | 8/1981 | Becker et al. |
| 4,299,053 | A | 11/1981 | Foote |
| 4,366,648 | A * | 1/1983 | Morin ................................. 47/52 |
| 4,765,372 | A | 8/1988 | Beecher |
| 4,872,802 | A * | 10/1989 | Abbe ........................ 414/416.09 |
| 4,887,387 | A | 12/1989 | Lesquir |
| 4,926,597 | A | 5/1990 | Landry |
| 5,085,076 | A | 2/1992 | Engelmann |
| 5,131,425 | A * | 7/1992 | Sturgis ........................ 137/116.5 |
| 5,427,144 | A * | 6/1995 | Teets et al. .................. 137/614.2 |
| 5,507,312 | A * | 4/1996 | Dillman .................... 137/533.15 |
| 5,956,894 | A * | 9/1999 | Eldridge ........................ 47/57.5 |
| 5,992,690 | A * | 11/1999 | Tracy .............................. 222/79 |
| 6,438,895 | B1 | 8/2002 | Fortier |
| 7,128,088 | B2 | 10/2006 | Andersson |
| 2007/0266628 | A1* | 11/2007 | Doolittle ........................ 47/57.5 |

* cited by examiner

*Primary Examiner* — Son T Nguyen
(74) *Attorney, Agent, or Firm* — Hodgson Russ LLP (57) ABSTRACT

A maple syrup production spout assembly (10) with a backflow check valve (79) is disclosed. The spout assembly is designed for use with vacuum-based maple syrup productions systems (200) and is used to prevent the backflow of sap (270) into the maple tree (100) and thus prevent the drying out of the taphole (110) due to microbial contamination. Certain existing maple production spout assemblies can be retrofitted to form the backflow check valve spout assembly disclosed herein. Methods of using the spout assembly in maple syrup production are also disclosed.

10 Claims, 5 Drawing Sheets

MAPLE SYRUP PRODUCTION SPOUT ASSEMBLY WITH BACKFLOW CHECK VALVE

FIELD OF THE INVENTION

The present invention relates generally to maple syrup production, and in particular relates to spout assemblies used in vacuum-based maple syrup production systems.

BACKGROUND ART

Maple syrup production involves drilling holes into (i.e., "tapping") maple trees, collecting the sap that exudes from the wound, and then reducing or "sugaring" down the sap using reverse osmosis and evaporators to form the final syrup. Details of maple syrup production are described in the publication entitled "North American Maple Syrup Producers Manual" (second edition), produced by Ohio State University, in cooperation with the North American Maple Syrup Council, and edited by Heiligmann, Koelling and Perkins, which is incorporated by reference herein by way of background information.

The traditional way of collecting maple sap uses buckets at the tap source. The sap is then collected in a tank and then transported to the "sugarhouse" for processing. Over the years, a variety of specialized hardware has been developed for this task, including both sap spouts and specialized sap collection buckets or bags. For many years, however, the basic techniques of maple syrup and sugar production remained essentially unchanged.

More recently, modern syrup producers have replaced the traditional bucket collection system with a tubing system that includes special spouts (usually 5/16" or 7/16" diameter) and plastic tubing "droplines" (usually 5/16" diameter and about 18" to 36" in length) connected to the various spouts. The droplines are then connected to lateral lines (also usually formed from 5/16" diameter plastic tubing) that run between different maple trees. The lateral lines are in turn connected to one or more "main lines" (usually 3/4" to 2" diameter) that run to the sugar house. Such systems are described in, for example, U.S. Pat. Nos. 2,877,601, 2,944,369, 3,046,698, and 3,057,115, and may either be gravity fed or utilize a vacuum pump to move the sap to a central collection point (e.g., an evaporator in the sugarhouse).

The sap flows from the tree through the spout and then through the line system when the pressure within the tree is greater than that in the lines. The line system then conveys the sap to the evaporator. To facilitate the extraction and transportation of the sap from the tree and to the evaporator, some systems use a pump to pull a vacuum within the line system. This increases the pressure differential between the inside of the line system and the tree, thereby increasing the volume of sap flow as compared to that which would naturally occur by gravity.

One of the main problems with such a vacuum-based system is the risk of microbial contamination of the taphole. The taphole formed in the tree is a wound. When a tree is wounded, microbes found in the environment (primarily *Pseudomonas* spp.) may colonize the taphole, thereby initiating a natural wound response and the process of "drying out," which is an industry term for the cessation of sap flow. Thus, once sap exits the tree and becomes contaminated by microbes, it should not be allowed to remain at the taphole or flow back into the tree. If the sap is allowed to move back into the tree, or if the taphole is open to the air within the tubing lines, the microbes will more readily colonize the taphole, initiate the wound-response process, and cause the taphole to dry out and cease yielding sap.

The droplines presently used in gravity-based maple syrup production systems help reduce sap backflow. However, in vacuum-based systems, due to the larger pressure gradient, droplines do not adequately prevent sap backflow when the vacuum is interrupted.

SUMMARY OF THE INVENTION

Current maple syrup spouts do not prevent sap from flowing back into the taphole when used in vacuum-based maple syrup production systems. The spout assembly of the present invention greatly reduces or prevents the backflow of sap into the tree through the use of a backflow check valve. This reduces microbial contamination of the taphole, increases soil-based water uptake by the tree, and increases sap yield for maple syrup production. The spout assembly can be manufactured separately, incorporated (retrofitted) into existing spout assembly designs, or incorporated into a spout assembly adapter that attaches to existing spout assemblies. Maple producers that utilize vacuum-based systems in their operations could benefit from the use of the maple spout assembly of the present invention.

A first aspect of the invention is a spout assembly for inserting into a taphole formed in a maple tree as part of a maple syrup production system that utilizes a line system under vacuum to convey sap from the maple tree. The assembly includes an input section defining an input channel and adapted for insertion into the taphole so as to receive a flow of sap from the maple tree, and an output section defining an output channel and configured to fluidly connect the output channel to the line system. The assembly also includes a main body section operably connected to the input and output sections and that defines an interior chamber to which the input and output channels are fluidly connected. The interior chamber contains a backflow check valve configured to substantially prevent the flow of sap in a direction from the output channel to the input channel and to allow the flow of sap in a direction from the input channel to the output channel.

A second aspect of the invention is a maple syrup production system that includes the above-described spout with its input end inserted into the taphole, and a line system operably connected to the spout assembly output end and to a vacuum pump that creates a vacuum differential between the line system and the taphole that causes the sap to flow from the taphole and through the spout assembly and through the line system.

A third aspect of the invention is a method of extracting sap from a maple tree. The method includes providing a spout assembly having an input end and output end, a main body section having an interior chamber fluidly connected to the input and output ends via respective input and output channels and that contains a backflow check valve that only allows sap to flow through the chamber from the input end to the output end. The method also includes forming a taphole in the maple tree and inserting the spout assembly input end into the taphole. The method further includes applying a vacuum to the spout assembly output end, wherein the application of the vacuum is subject to interruption, and substantially preventing sap that has exited the tree from reentering the tree through the spout assembly via activation of the backflow check valve during the interruption.

A fourth aspect of the invention is maple syrup production spout assembly for managing the flow of sap. The assembly includes a main body section defining a chamber that contains a backflow check valve comprising a floating blocking member configured to move within the chamber, and input and output sections having respective input and output channels with respective input and output ends, the input and output channels fluidly connected to the main body chamber. In a first operational state, the floating blocking member resides in first position within the chamber that allows sap to flow in a direction from the input end toward the output end, and in a second operational state the floating blocking member resides in a second position with the chamber that substantially prevents the flow of sap in a direction from the output end toward to the input end.

A fifth aspect of the invention is a method of extracting sap from a maple tree. The method includes forming a taphole in the maple tree and inserting a spout into the taphole at a spout input end, wherein the spout has an output end and does not have backflow prevention capability. The method also includes connecting a backflow check valve to the spout output end, wherein the backflow check valve has an input end and an output end that only allows sap to flow in a direction away from the tree. The method further includes applying a vacuum to the spout via the backflow check valve, wherein the application of the vacuum is subject to interruption.

Additional features and advantages of the invention are set forth in the detailed description that follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF INVENTION

Figure 1:
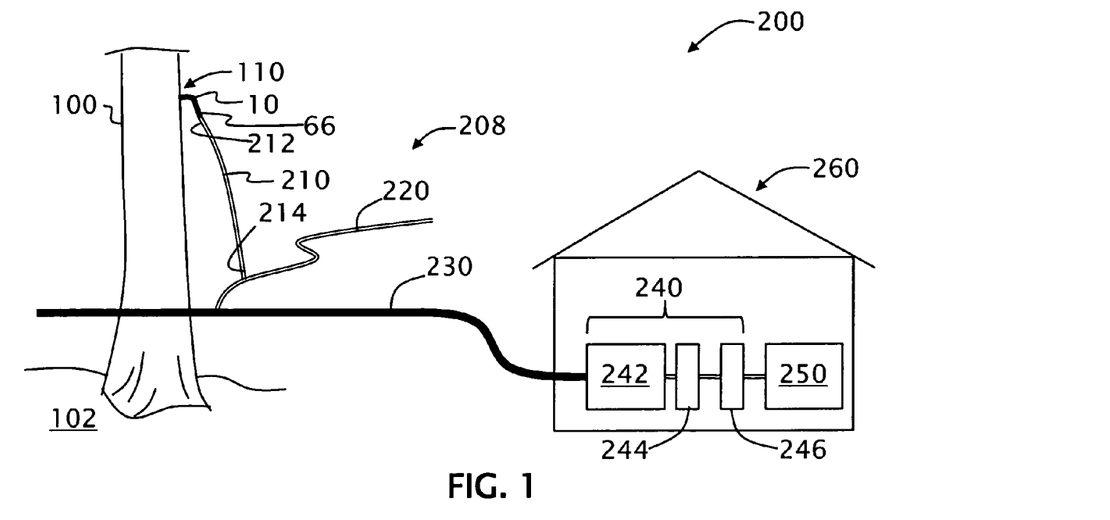
FIG. 1 is a schematic diagram of a vacuum-based maple syrup production system that uses the spout assembly of the present invention.

FIG. 1 shows a schematic diagram of an example maple syrup production system 200 that includes spout assembly 10 connected to tree 100 at a taphole 110 formed therein. Spout assembly 10 is described in greater detail below. System 200 includes a line system 208 that includes a dropline 210, a lateral line 220 and a mainline 230. A first end 212 of a dropline 210 is fluidly connected to an output end 66 of spout assembly 10 while the other end 214 is fluidly connected to lateral line 220.

Lateral line 220 in turn is operably connected to mainline 230, which in turn is operably connected to vacuum pump system 240 that includes a vacuum pump 242, an extractor 244 and a sap storage tank 246 An evaporator 250 is operably connected to vacuum pump system 240 Vacuum pump system 240, extractor 244, storage tank 246 and evaporator 250 are shown as housed in a sugarhouse 260. System 200 thereby provides vacuum-assisted fluid communication between taphole 110 and evaporator 250 so that sap can flow from tree 100 to the evaporator. It is noted here that "fluid communication" refers to both the sap as a fluid and the air the line system as a "fluid." Said differently, line system 208 is sufficiently air-tight so that vacuum system 240 can pull a sufficient vacuum (e.g., 15-28 inches of mercury).

Figure 2:
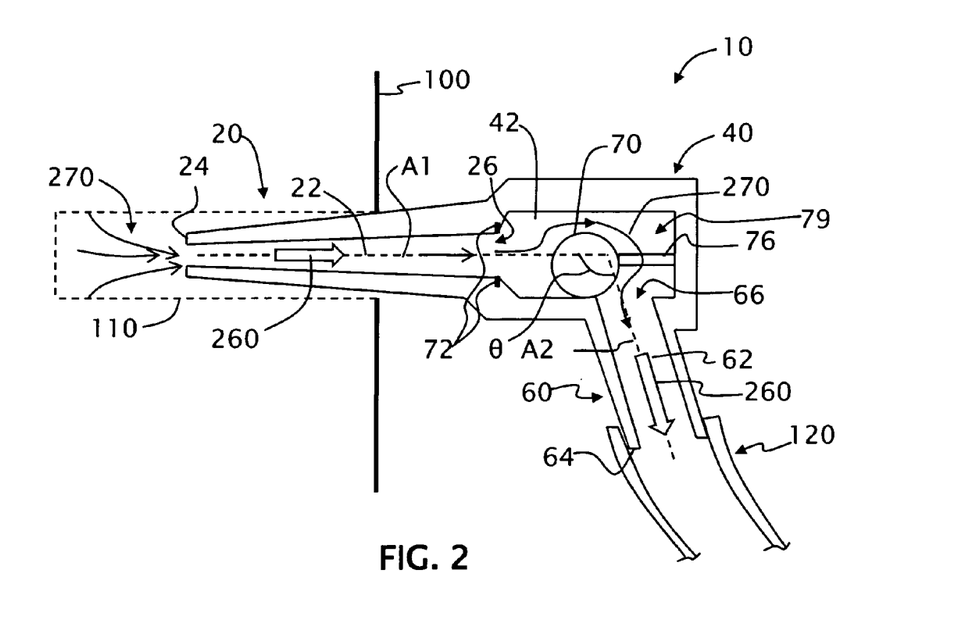
FIG. 2 is a close-up view of an example embodiment of the spout assembly of the present invention as used in the system of FIG. 1, and showing an example embodiment of a backflow check valve geometry in the "flow" operational state.

FIG. 2 is a schematic cut-away close-up side view of an example embodiment of maple spout assembly 10 according to the present invention as used in maple syrup production system 200 of FIG. 1. Maple spout assembly 10 in includes a nose section 20, a main body section 40 that defines an interior chamber 42 therein, and a neck section 60. In an example embodiment, nose section 20 is tapered to facilitate insertion into taphole 110. Nose section 20 defines a nose (input) channel 22 having an open distal end 24, an open proximal end 26, and a central axis A1. Proximal channel end 26 is open to interior chamber 42.

Neck section 60 defines a neck (output) channel 62 having a central axis A2 and an open distal end 64 and an open proximal end 66. Output channel 62 is connected to chamber 42 at open proximal end 66. In an example embodiment, channel central axes A1 and A2 intersect within chamber 42 at an angle θ, where angle θ is preferably a right angle or an obtuse angle. Input channel 22 and output channel 62 are fluidly connected via a flow path FP that passes through chamber 42 in first operational state referred to herein as the "flow" or "ON" operational state.

Chamber 42 contains a blocking member 70. In an example embodiment, blocking member 70 is free to move (i.e., "float") within the chamber generally along the direction of axis A1, and is captive within the chamber. Blocking member 70 is preferably sized to be larger than the input channel proximal end 26 and is generally configured so that it can block off (seal) input channel 22 at the proximal end when the blocking member is brought into contact therewith to prevent fluid communication between the input channel and chamber 42 over flow path FP. This geometry represents a second operational state of spout assembly 10, also called the "blocking" or "OFF" operational state.

In one example embodiment, floating blocking member 70 is a ball and input channel proximal end 26 has a frustroconical shape that accommodates the ball to form a leak-proof seal. In another example embodiment, floating blocking member 70 is a disk and input channel proximal end 26 is flat and accommodates the disc to form a leak-proof seal (see FIG. 4 and FIG. 5). In an example embodiment, input channel proximal end 26 includes a gasket 72 to help form the leak-proof seal in the blocking operational state. Other shapes and configurations for blocking member 70 are also possible, such as a flap-type member (not shown) that is anchored at one of its end within chamber 42 and that can rotate into place to block off input channel proximal end 26 to prevent the backflow of sap 270.

In an example embodiment of spout assembly 10, a stand-off member 76 is arranged within chamber 42 to prevent blocking member 70 from moving into a position where it might otherwise block off flow path FP at proximal neck channel end 66. This arrangement of floating blocking member 70 and stand-off member 76 within chamber 42 forms one type of automatic backflow check valve 79 that allows for only the one-way flow of sap 270 through spout assembly 10 in the direction from nose section 20 towards neck section 60. Thus, nose distal end 24 constitutes a spout assembly "input end" and neck distal end 64 constitutes a spout assembly "output end."

In a preferred example embodiment, spout assembly 10 is made of plastic (e.g., injection-molded plastic), as is blocking member 70 contained therein. Blocking member 70 may be, for example, a plastic or rubber ball. Other materials suitable for use as spout assemblies for maple syrup taps may also be used. Spout assembly 10 of FIG. 2 is shown in the flow operational state wherein blocking member 70 rests against stand-off member 76 so that sap 270 can flow through the spout assembly from input end 24 to output end 64 over flow path FP.

With reference to FIG. 1 and FIG. 2, in the operation of maple syrup production system 200, vacuum pump 240 is activated to pull a vacuum in line system 208 to facilitate the flow of sap 270 out of maple tree 100 and into spout assembly input end 24 (see arrows 260). In this situation, the pressure differential caused by the vacuum causes blocking member 70 to move into position against stand-off member 76, thereby placing spout assembly 10 in the flow operational state. This allows sap 270 to flow through input channel 22, through chamber 42, around the blocking member 70 contained therein, and then through channel 62 to dropline 210 via flow path FP. Sap 270 then runs through the rest of line system 208 to evaporator 250. It is noted here that sap storage tank 246 is connected to the evaporator, sometimes with an intermediate stage passing through a reverse osmosis machine (not shown).

On those occasions when the operation of vacuum system 240 is interrupted either intentionally or through a system malfunction or shutdown, the pressure differential in system 200 reverses so that there is less pressure in tree 100 than in line system 208. This causes the flow of sap 270 to reverse so that sap that has left the tree will seek to flow back into the tree. As discussed above, this is disadvantageous because microbes in the sap will initiate a reaction in tree 100 that will cause taphole 110 to "dry out."

Figure 3:
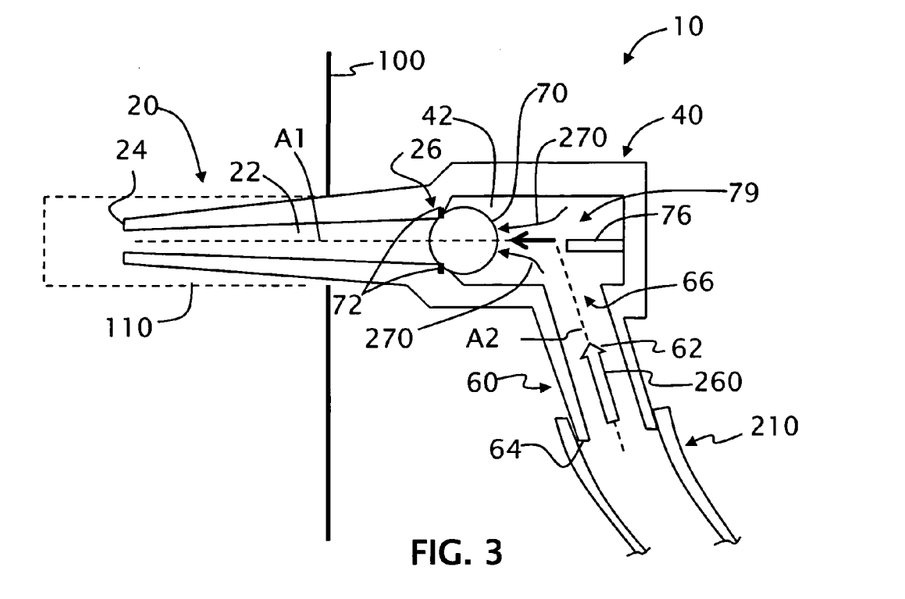
FIG. 3 is the same as FIG. 2, but illustrating the operation of the backflow check valve in the closed position associated with the "blocking" operational state.

With reference now also to FIG. 3, to prevent this sap flow reversal from occurring during vacuum interruption, the reversed pressure difference automatically causes blocking member 70 to move along axis A1 until it forms a seal at input channel proximal end 26. This places spout assembly 10 in the blocking operational state, which blocks the flow path FP and substantially prevents sap 270 from returning to taphole 110, thereby substantially preventing the taphole from drying out. The blocking operational state of spout assembly 10 also has the added benefit of facilitating the uptake of water by tree 100 via the soil 102 rather than via dropline 210. Note also that sap 270 residing in input channel 22 is prevented from flowing back to the taphole because sealing off the input channel at proximal end 26 creates a vacuum within the input channel itself as sap tries to flow back towards input end 22. Note also that the reverse flow of sap 270 itself will cause blocking member 70 to move to the blocking position within chamber 42. The reverse flow of sap stops quickly in this case because blocking member 70 moves quickly over the short distance within chamber 42 to move into place against input channel proximal end 26.

Figure 4:
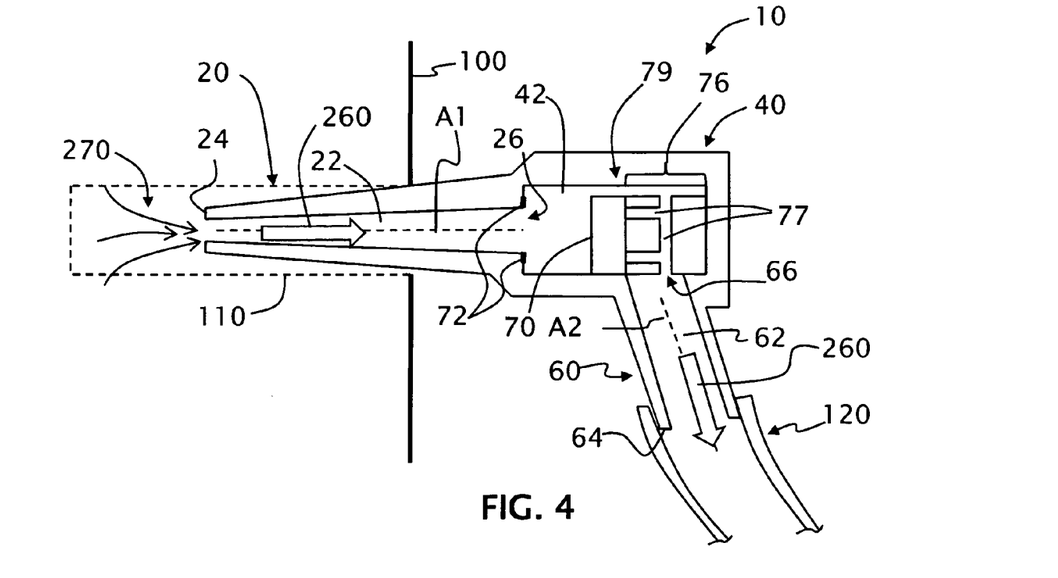
FIG. 4 and FIG. 5 are similar to FIG. 2 and FIG. 3, respectively, and illustrate another example embodiment of a backflow check valve that uses a floating disc.
Figure 5:
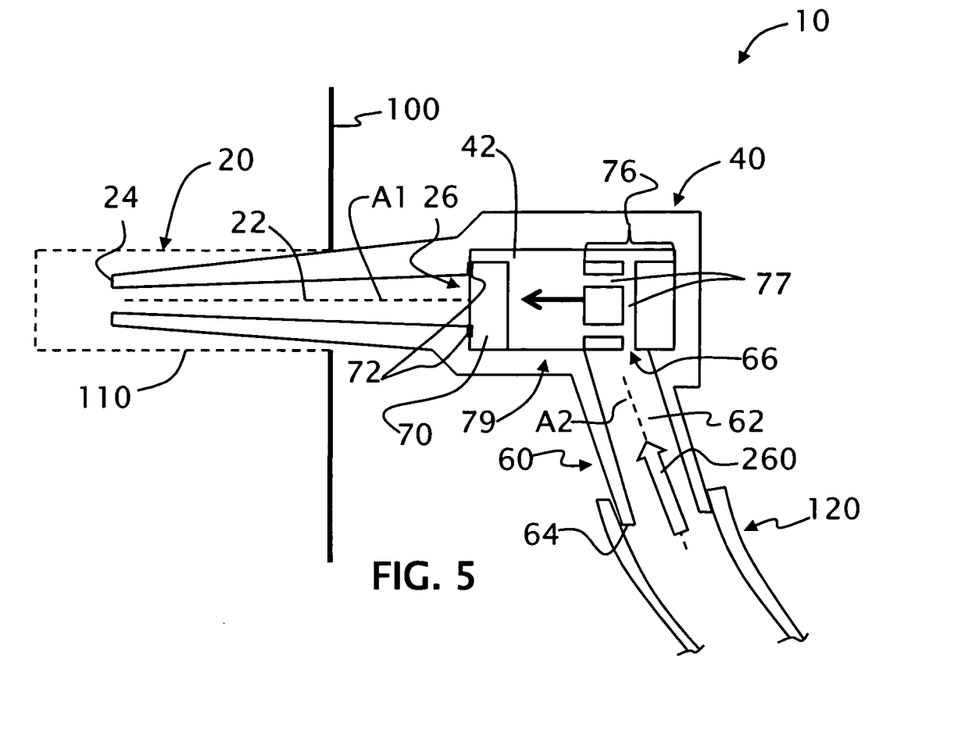

FIG. 4 and FIG. 5 are similar to FIG. 2 and FIG. 3, respectively, and illustrate an example embodiment of spout assembly 10 in the "flow" and "blocking" states, respectively, wherein the spout assembly employs a floating disc-type blocking member 70. Stand-off member 76 of the disc embodiment includes a number of conduits 77 that allow for the flow path to run through the stand-off member.

Figure 6:
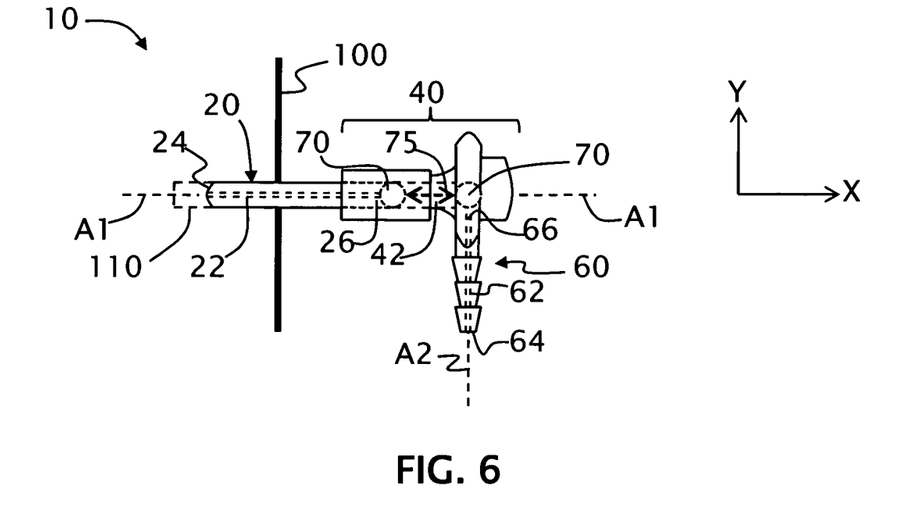
FIG. 6 is a schematic side view of an example embodiment of the maple syrup production spout assembly of the present invention that is formed by retrofitting a commonly used plastic maple syrup production spout assembly.

An example plastic spout assembly 10 that can be retrofitted to form the backflow check valve spout assembly 10 of the present invention is made by the Leader Evaporator Company of Swanton, Vt. FIG. 6 is a schematic side view of an example embodiment of the maple syrup production spout assembly 10 of the present invention that is a retrofit to the Leader plastic maple syrup production spout assembly. Cartesian X-Y coordinates are shown in FIG. 6 for the sake of reference.

Figure 7:
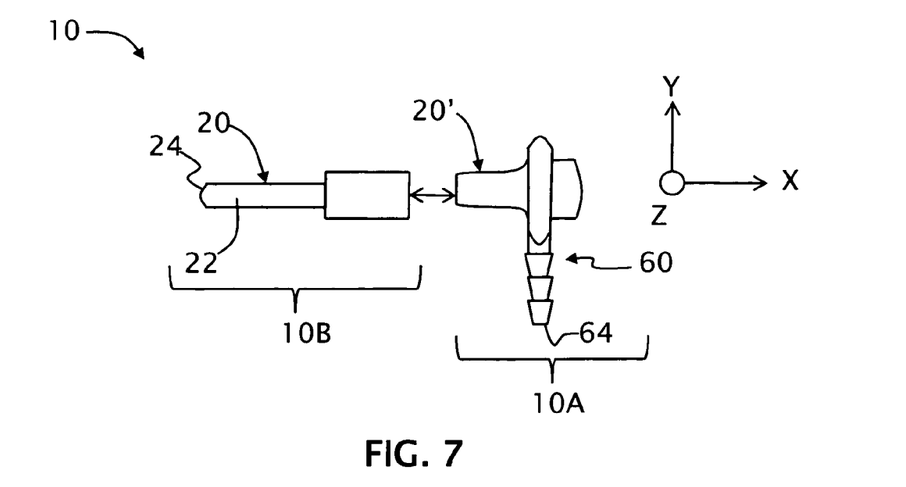
FIG. 7 is an exploded view of an example of the spout assembly of FIG. 6 wherein the spout assembly comprises a spout section and a mating adapter section.

Spout assembly 10 of FIG. 6 includes a spout section 10A and a mating adapter section 10B, as shown in the exploded view of FIG. 7. Spout portion 10A includes its own "nose" portion 20' that mates with adapter portion 10B, which also constitutes the nose portion 20 of the spout assembly. In an example embodiment, spout assembly 10 of FIG. 6 is retrofitted with a floating ball type of blocking member 70 that is free to move within a channel-type chamber 42 generally along axis A1, i.e., along the +X and –X directions (see arrow 65).

A groove (not shown in FIG. 6; see, e.g., groove 49 in FIG. 8) in channel-type chamber 42 allows for the sap to move past blocking member 70 in the "flow" operational state when the blocking member is at the rear (i.e., the right-most position in FIG. 6) of the channel-type chamber. Note that in this example embodiment of spout assembly 10, backflow check valve 79 does require the use of a stand-off member 76.

In the blocking operational state caused by a reversal of the pressure differential between input and output ends 24 and 64 as discussed above, ball-type blocking member 70 moves along axis A1 in the –X direction from chamber portion 43 until it reaches input channel proximal end 26 and seals off input channel 22. This cuts off the (reverse) flow path FP, thereby substantially preventing the flow of sap back into taphole 110.

Figure 8:
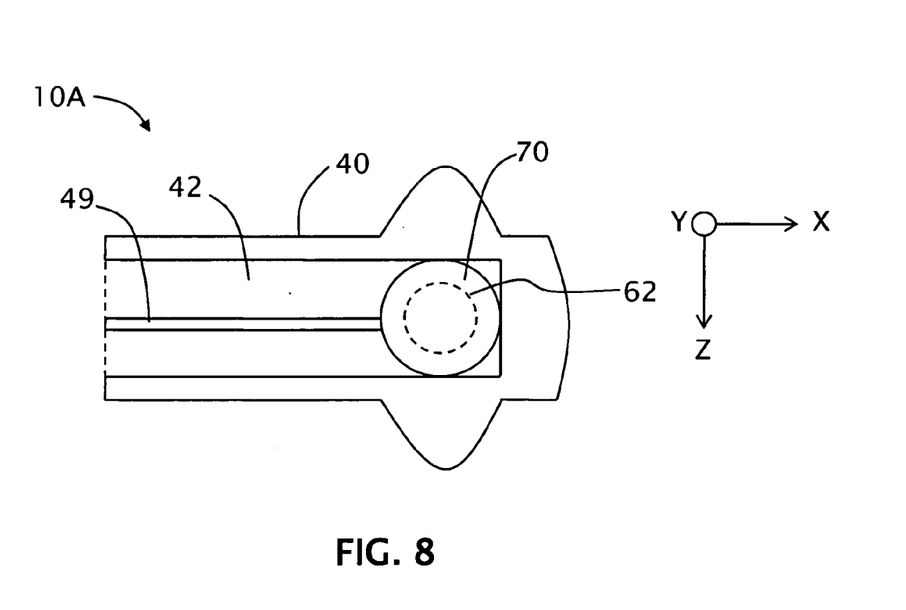
FIG. 8 is a cross-sectional view of spout section taken in the X-Z plane that illustrates an example embodiment wherein the spout assembly of FIG. 6 includes at least one groove formed in the chamber so as to allow sap to flow through the spout section from the input channel to the output channel.

FIG. 8 is a cross-sectional view of spout portion 10A taken in the X-Z plane that illustrates another example embodiment of spout assembly 10, wherein the spout assembly of FIG. 6 includes at least one groove 49 formed in channel-type chamber 42. Groove 49 connects chamber (channel) 42 to output channel 62 to allow sap 270 to flow past ball-type blocking member 70 even while this blocking member resides in a position within channel 42 that would otherwise close of sap flow through the output channel.

Figure 9:
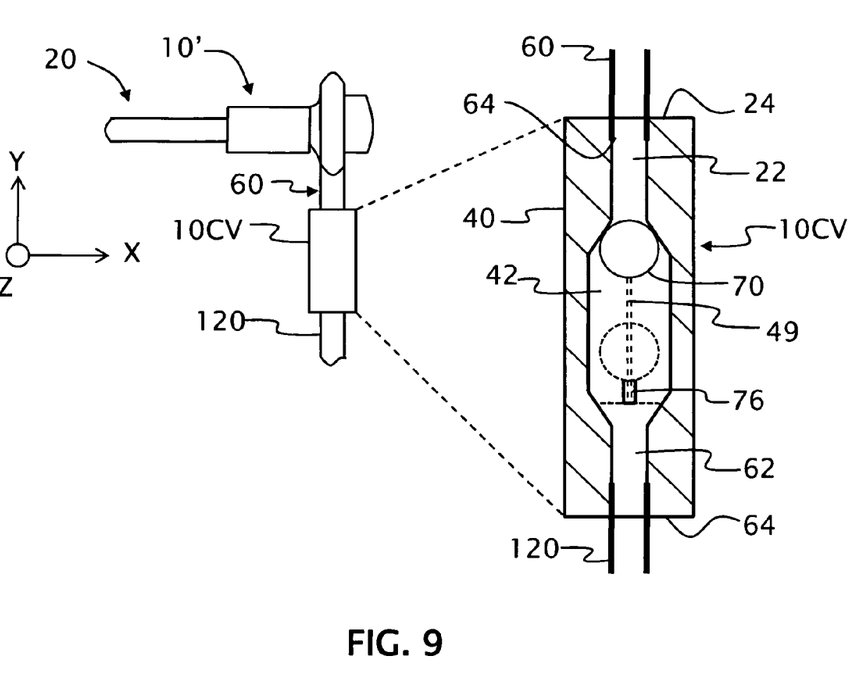
FIG. 9 is a side view of a spout assembly that includes a spout connected to a backflow check valve, wherein the spout does not include backflow-check capability.

FIG. 9 is a side view of a spout assembly 10 that includes a spout 110' connected at its output end 64 to a backflow check valve 10CV. In this embodiment, spout 110' does not include backflow-check capability of the other spout assemblies 10 as described above and in this sense is a conventional maple spout.

In the example embodiment of spout assembly 10 as shown in FIG. 9, backflow check valve 10CV is connected directly to conventional spout 10' at output end 64, but it can also be connected directly to spout 10' via a section of dropline 120. Backflow check valve 10CV includes a body 40 with a chamber 42 that is connected at one end to an input channel 40 and at another end to an output channel 62. Blocking member 70 is provided within chamber 42. Stand-off member 76 formed within chamber 42 is configured to prevent blocking member 70 from blocking output channel 62 while also allowing sap 270 to flow through backflow check valve 10CV when vacuum system 240 is in operation. In an example embodiment similar to that shown in FIG. 8, blocking member 70 is formed from part of body 40, and one or more grooves are provided that allow for sap to flow through chamber 42 in the direction input channel 22 to output channel 62.

This embodiment of spout assembly 10 that employs a conventional maple spout 10' and a backflow check valve 10CV operably connected thereto allows for the use of conventional maple spouts without having to retrofit the spouts, or to use the spout assembly 10 of the present invention that has built-in backflow-check capability.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A maple syrup production system comprising a line system under a vacuum to convey sap from a maple tree; and a spout assembly for inserting into a taphole formed in the maple tree; comprising:
    an input section defining an input channel and adapted for insertion into the taphole so as to receive a flow of sap from the maple tree;
    an output section defining an output channel and configured to fluidly connect the output channel to the line system; and
    a main body section operably connected to the input and output sections and that defines an interior chamber to which the input and output channels are fluidly connected, wherein the interior chamber contains a backflow check valve that allows the flow of sap in a direction from the input channel to the output channel when the vacuum is applied to the output end, and that substantially prevents the flow of sap in a direction from the output channel to the input channel when the vacuum is interrupted.

2. The spout assembly of claim 1, wherein the backflow check valve comprises:
    a floating blocking member contained with the chamber so as to selectively block the flow of sap in the direction from the output channel to the input channel.

3. The spout assembly of claim 2, wherein the backflow check valve further comprises:
    a stand-off member contained within the chamber and configured to prevent the floating blocking member from blocking the output channel.

4. The spout assembly of claim 2, wherein the chamber includes a portion wherein the floating blocking member resides when sap flows in the direction from the input channel to the output channel so as to maintain fluid communication between the input and output channels.

5. The spout assembly of claim 2, wherein the floating blocking member comprises a ball.

6. A method of extracting sap from a maple tree, comprising:
    providing a maple syrup production system comprising a line system under a vacuum to convey sap from the maple tree, and a spout assembly having an input end and output end, a main body section having an interior chamber fluidly connected to the input and output ends via respective input and output channels and that contains a backflow check valve that only allows sap to flow through the chamber from the input end to the output end;
    forming a taphole in the maple tree;
    inserting the spout assembly input end into the taphole;
    applying the vacuum to the spout assembly output end, wherein the application of the vacuum is subject to interruption; and
    substantially preventing sap that has exited the tree from reentering the tree through the spout assembly via activation of the backflow check valve during said interruption.

7. The method of claim 6, wherein applying the vacuum includes connecting a line system to the spout assembly output end and applying a vacuum to the line system.

8. The method of claim 6, further comprising:
    forming the backflow check valve by providing a floating blocking member within the chamber.

9. The method of claim 8, further including providing a stand-off member within the chamber that is configured to prevent the floating blocking member from blocking the output channel.

10. The method of claim 8, further including providing a chamber portion wherein the floating member can reside so as to maintain fluid communication between the input and output ends.

* * * * *

UNITED STATES PATENT AND TRADEMARK OFFICE
CERTIFICATE OF CORRECTION

| | | |
|---|---|---|
| PATENT NO. | : 8,539,712 B2 | Page 1 of 1 |
| APPLICATION NO. | : 12/286032 | |
| DATED | : September 24, 2013 | |
| INVENTOR(S) | : Perkins | |

It is certified that error appears in the above-identified patent and that said Letters Patent is hereby corrected as shown below:

In the claims:

After Claim 10 (column 8, line 54, of the issued patent), please insert:

--11. The spout assembly of claim 1, wherein the input channel has a first central axis, the output channel has a second central axis, and wherein the first and second central axes intersect within the chamber to form either a right angle or an obtuse angle.

12. The spout assembly of claim 1, wherein the spout assembly includes a spout section and an adapter section, and wherein the spout section includes the main body section and the chamber includes at least one groove formed therein that allow saps to flow past the blocking member in the direction from the output channel to the input channel.--

Signed and Sealed this
Third Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,539,712 B2 | Page 1 of 1 |
| APPLICATION NO. | : 12/286032 | |
| DATED | : September 24, 2013 | |
| INVENTOR(S) | : Perkins | |

It is certified that error appears in the above-identified patent and that said Letters Patent is hereby corrected as shown below:

On the title page, under abstract "10 Claims, 5 Drawing Sheets" should read --12 Claims, 5 Drawings Sheets--.

In the claims:

After Claim 10 (column 8, line 54, of the issued patent), please insert:

--11. The spout assembly of claim 1, wherein the input channel has a first central axis, the output channel has a second central axis, and wherein the first and second central axes intersect within the chamber to form either a right angle or an obtuse angle.

12. The spout assembly of claim 1, wherein the spout assembly includes a spout section and an adapter section, and wherein the spout section includes the main body section and the chamber includes at least one groove formed therein that allow saps to flow past the blocking member in the direction from the output channel to the input channel.--

This certificate supersedes the Certificate of Correction issued February 3, 2015.

Signed and Sealed this
Tenth Day of March, 2015

Michelle K. Lee
*Deputy Director of the United States Patent and Trademark Office*